UNITED STATES PATENT OFFICE 2,663,700

PURIFICATION OF SULFONATED ALKENYL AROMATIC RESINS

Harold H. Roth, Bay City, and Hugh B. Smith, Midland, Mich., assignors to The Dow Chemical Company, Midland, Mich., a corporation of Delaware No Drawing. Application December 1, 1951, Serial No. 259,482

5 Claims. (Cl. 260—79.3)

This invention concerns an improved method for the production and purification of sulphonated alkenyl aromatic resins. It pertains especially to a method wherein the resin sulphonic acids are obtained directly in a granular form containing acidic inorganic impurities, which method permits removal of such impurities while retaining the resin sulphonic acids in the granular form.

The alkenyl aromatic resins employed herein are solid thermoplastic polymers of mono-alkenyl aromatic hydrocarbons having the general formula:

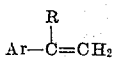

wherein Ar represents an aromatic hydrocarbon radical and R is hydrogen or a methyl radical. Examples of such alkenyl aromatic resins are the solid polymers of styrene, ar-vinyltoluene, ar-vinylxylene, alpha-methylstyrene, and ar-isopropenyltoluene; and the solid copolymers of two or more of such compounds with one another, e. g. copolymers of styrene and alpha-methylstyrene, copolymers of styrene and ar-methylstyrene, and copolymers of styrene and ar-dimethylstyrene, etc.

It is known that polystyrene and other alkenyl aromatic resins may be sulphonated by reaction with sulphonating agents such as concentrated sulphuric acid, fuming sulphuric acid, chlorosulphonic acid, or sulphur trioxide, etc., to obtain resin sulphonates which vary widely from one another in properties with changes in the identity or molecular weight of the alkenyl aromatic resin starting materials, the kind of sulphonating agent employed, the conditions under which the sulphonation reaction is carried out, and the extent to which the resin is sulphonated. For instance, polystyrene may be sulphonated to obtain water-insoluble resin sulphonates of either low, or fairly high, sulphonic acid radical content. It may also, under suitable reaction conditions, be sulphonated to obtain resin sulphonates which are readily soluble or dispersible in water. Similar results may be obtained by the sulphonation of other alkenyl aromatic resins. All of the resin sulphonic acids are useful as agents for neutralizing alkaline materials. The resin sulphonic acids, and alkali salts thereof, which are soluble or dispersible in water may be used as sizing materials, or as agents for thickening aqueous media.

The physical form in which the resin sulphonic acids are initially obtained also varies with change in the conditions under which they are prepared. When a solution of polystyrene, or other alkenyl aromatic resin, in carbon tetrachloride, chloroform, or other organic liquid relatively unreactive with a sulphonating agent, is treated with concentrated sulphuric acid to form the resin sulphonic acid, the latter is usually obtained as a gummy, or gelatinous, swollen mass which cannot conveniently be separated from the reaction medium by filtration. However, in a copending application of one of us, i. e. Roth, Serial No. 231,049, filed June 11, 1951, and in a copending application of Teot and Wiggins, Serial No. 231,050, filed June 11, 1951, it is shown that treatment of a similar alkenyl aromatic resin solution with a sulphonating agent such as chlorosulphonic acid or sulphur trioxide results in rapid formation of a resin sulphonic acid which precipitates as granules, or particles, during formation of the same. This granular product may readily be separated from the reaction medium by filtration or decantation. Because of the ease with which they may be separated from accompanying liquids, the alkenyl aromatic resin sulphonic acids are advantageously made by the last mentioned procedure, i. e. using chlorosulphonic acid or sulphur trioxide as the sulphonating agent. This same procedure is used in the method of the present invention.

The resin sulphonic acids obtained in either of the above-mentioned ways are contaminated with ionizable inorganic impurities, e. g. sulphuric acid, chlorosulphonic acid, hydrochloric acid, or sulphur trioxide, etc., which are acidic, i. e. acid-acting when contacted with water. It has been found that the presence of such impurities, even in small amount, e. g. 0.5 per cent by weight or less, reduces greatly the effectiveness of the sulphontes in thickening, or increasing the viscosity of, aqueous liquids to which they are added. Because of this fact, and the further fact that the kinds or proportions of the impurities frequently vary from one batch of such product to another and that a substantially pure product of uniform quality is generally desired, it is important in the production of a sulphonated alkenyl aromatic resin, that the impurities be removed as completely as possible.

In a copending application of H. H. Roth, Serial No. 175,471, filed July 22, 1950, it is disclosed that the sulphuric acid normally present in the swollen mass of sulphonated polystyrene which is obtained when using concentrated sulphuric acid as the sulphonating agent, may be extracted from the product with any of several organic liquids, and that concentrated, or preferably glacial, acetic acid is particularly effective for the purpose.

We have now found that the acidic inorganic impurities which are normally present in the granular alkenyl aromatic resins that are obtained, as hereinbefore described, using chlorosulphonic acid or sulphur trioxide as the sulphonating agent, may be similarly extracted from the products. However, we have further found that in most instances acetic acid (which is particularly effective for the extraction of residual sulphuric acid from the swollen body of resin sulphonic acid obtained by a sulphonation with concentrated sulphuric acid) reduces the granular alkenyl aromatic resin sulphonic acids to swollen, gummy masses and, therefore, is unsuitable for extracting from such granular products the ionizable inorganic impurities normally present therein.

We have discovered a class of liquid extractants and a procedure which permit the extraction of ionizable inorganic impurities from the granular alkenyl aromatic resin sulphonic acids without destroying the granular form of the latter. The sulphonated resins are more readily handled, e. g. separated from liquids by filtration, etc., when in granular form than when in the form of a swollen, or gelatinous, mass. The invention permits convenient and economical manufacture of the alkenyl aromatic resin sulphonates in a form of high purity.

As hereinbefore indicated, the procedure in making the granular alkenyl aromatic resin sulphonates, consists essentially in dissolving a thermoplastic alkenyl aromatic resin in a relatively inert liquid, advantageously a liquid polychlorinated hydrocarbon, and treating the solution with chlorosulphonic acid, or sulphur trioxide. Sulphur trioxide, when employed as the sulphonating agent, may be added as such or in the form of a derivative thereof which dissociates in the reaction mixture to form the sulphur trioxide in situ. Examples of such sulphur trioxide derivatives are the addition compounds, i. e. "complexes," of sulphur trioxide with ethers, such as the complex of sulphur trioxide and dioxane, etc. For convenience, sulphur trioxide and such unstable derivatives thereof capable of forming sulphur trioxide in situ, are referred to generically herein as "sulphur trioxide source materials."

The thermoplastic alkenyl aromatic resins are all appreciably soluble in liquids, e. g. liquid polychlorinated hydrocarbons, which are adequately resistant to attack by the sulphonating agents. Such a resin is advantageously dissolved in a sulphonation-resistant liquid to form a dilute solution thereof, e. g. a solution of less than 10, and preferably of from 0.5 to 5, weight per cent concentration. When using chlorosulphonic acid as the sulphonating agent, any of the aforementioned liquid polychlorinated hydrocarbons may be used as a solvent for the polymer, but those having a viscosity of from 0.6 to 1 centistoke at room temperature are preferred. A liquid carbon chloride, such as carbon tetrachloride or tetrachloroethylene, is usually employed as a solvent for the alkenyl aromatic resin when the latter is to be sulphonated with sulphur trioxide.

The above mentioned polymer solution and the sulphonating agent, i. e. chlorosulphonic acid, or sulphur trioxide, or an unstable complex of the latter, may be admixed with one another in any desired order or manner. Usually from 0.8 to 1.6 molecular equivalents of chlorosulphonic acid or sulphur trioxide is employed per mole of alkenyl aromatic compound, or compounds, chemically combined in the resin but the sulphonating agent may be used in somewhat smaller or in larger proportions. When using chlorosulphonic acid as the sulphonating agent, the sulphonation occurs most smoothly, rapidly, and completely if carried out by running streams of the sulphonating agent and the polymer solution into admixture with one another, with stirring of the resultant mixture, so that the reactants are admixed directly in the proportions in which they are to be reacted together. The same procedure may be employed when using sulphur trioxide as the sulphonating agent, but is not required. A sulphonation of an alkenyl aromatic resin with sulphur trioxide occurs readily and to a satisfactory extent regardless of whether such a procedure is employed, or the sulphur trioxide is added gradually to the resin solution.

The sulphonation of an alkenyl aromatic resin with chlorosulphonic acid, or sulphur trioxide, in either of the ways just mentioned is usually carried out at temperatures of from −20° to 45° C. The preferred reaction temperatures are from 0° to 35° C. when using sulphur trioxide acid as the sulphonating agent, and from 10° to 35° C. when using chlorosulphonic acid for the sulphonation.

As hereinbefore mentioned, during the treatment of an alkenyl aromatic resin solution with chlorosulphonic acid or sulphur trioxide under the conditions described above, the sulphonated resin product precipitates in the form of fairly hard, i. e. non-gummy, distinct granules or particles. The product is removed from the liquid reaction medium by filtration, decantation, or by evaporation of such medium, or in other usual ways. It consists, for the most part of the sulphonated resin in its acidic form, i. e. in the form of the resin sulphonic acid, but contains a minor amount of one or more of the aforementioned acidic inorganic impurities. The presence of such impurities reduces greatly the effectiveness of the resin sulphonic acid, or an alkali salt thereof, in thickening, or increasing the viscosity of, an aqueous liquid when added thereto.

According to the invention, such acidic inorganic impurities are removed from the granular resin sulphonic acids by extraction with a substantially anhydrous liquid which is not a solvent for, and is not dissolved to an appreciable extent by, the resin sulphonic acid. There are a wide variety of liquids, such as water, ethers, esters, alcohols, ketones, aldehydes, acetals, unsaturated organo-nitriles, etc., in which the impurities are soluble to an appreciable extent. However, many of the liquids, e. g. water, lower aliphatic alcohols, lower aliphatic carboxylic acids and esters thereof, unsaturated organonitriles, lower aliphatic aldehydes and corresponding acetals, and certain polychlorinated hydrocarbons such as chloroform, are either solvents for the resin sulphonic acids, or ar dissolved by the latter to an extent such as to destroy the granular form of the resin sulphonic acids by converting them to swollen gummy masses. In order to be satisfactory as an agent for extracting the impurities from the granular resin sulphonic acids, it is necessary that a liquid be a solvent for the impurities, but not for the resin sulphonic acids, and that it not be dissolved by the resin sulphonic acids to an extent such as to render the latter tacky or gummy. The simple hydrocarbon ethers, free of functional groups other than the ether linkage; simple ketones free of functional groups other than the carbonyl radical thereof; liquid sulphur dioxide; and certain chlorinated lower paraffinic hydrocarbons having one or two chlorine atoms in the molecule, have been found to possess the necessary selective solvent action. Specific illustrations of liquids which may be used to extract the inorganic impurities from the granular resin sulphonic acids without destroying the granular form of the latter are diethyl ether, dioxane, bis-(n-butyl) ether, bis-(beta-chloroethyl) ether, tetrahydrofuran, acetone, methyl ethyl ketone, diethyl ketone, methylene chloride, and liquid sulphur dioxide, and solutions of any two or more of such compounds in one another, e. g. solutions of diethyl ether and dioxane, or solutions of acetone and methyl ethyl ketone, etc.

It is necessary that the liquid extractant be substantially anhydrous, i. e. that it be free of water in amount such as to render the resin sulphonic acid tacky or gummy. The proportion of water which can be tolerated in the extraction mixture, without rendering the resin sulphonic acid sticky, varies somewhat for different extractants, but is usually less than 1.0 per cent, and in some instances less than 0.5 per cent, of the weight of the extractant, i. e. moisture in amount up to 0.4 per cent of the weight of the extractant can usually be tolerated. Since many of the liquid extractants tend to absorb moisture upon standing in contact with air, it is desirable that they be dried prior to use in the process. The resin sulphonic acids also tend to absorb moisture from the air; hence, they are advantageously treated to extract the impurities therefrom shortly after being formed, or are protected against free access of moist air prior to the extraction.

The extraction to remove the acidic inorganic impurities from the granular resin sulphonic acids may be carried out batchwise, or in a continuous manner, in accordance with usual extraction procedures. For instance, the impure, granular resin sulphonic acid may be admixed with one of the aforementioned liquid extractants to form a slurry, and the slurry be stirred or otherwise agitated to factilitate the extraction, and then be filtered. Usually, two or more of such batchwise extractions are carried out so as to render the product nearly free of the acidic inorganic impurities incident to its manufacture. Again, the extraction may be carried out batchwise, or continuously, using a Soxhlet extractor, or it may be carried out continuously by feeding the impure resin sulphonic acid and the liquid extractant to opposing end-sections of an extraction tower in a manner such that they pass through the tower counter to one another, and withdrawing the extract and the purified resin sulphonic acid from the tower at rates corresponding to the rates of feed.

After extracting the impurities therefrom, the minor amount of liquid extractant adhering to the granular resin sulphonic acid is vaporized therefrom, e. g. by warming the product at atmospheric pressure, or under vacuum. The purified resin sulphonic acid may be marketed as such, or may be neutralized with an alkali such as ammonia, caustic soda, caustic potash, sodium carbonate, or postassium carbonate, etc., to form a salt thereof.

The following examples describe ways in which the invention has been practiced, and illustrate certain of its advantages, but are not to be construed as limiting the invention.

EXAMPLE 1

This example illustrates a preparation and purification of sulphonated polystyrene in accordance with the invention. The solid polystyrene which was used as a starting material had a solution viscosity of 8 centipoises at 25° C. The expression "solution viscosity," as herein employed, refers to the viscosity of a solution consisting of 1 part by weight of a polymer and 9 parts of toluene. A solution of 115.5 grams of the polystyrene in 1650 cc. of methyl chloroform was fed at a rate of 6.2 cc. per minute to a vessel which initially contained 200 cc. of methyl chloroform. A solution of 16.5 cc. of chlorosulphonic acid (of 95.5 per cent by weight purity) in 217.5 cc. of methyl chloroform was, at the same time, fed to the vessel at a rate of 3.9 cc. per minute. The reaction mixture in the vessel was stirred and maintained, by external cooling, at approximately 20° C. during feed of the above-mentioned solutions thereto. The feed of the two solutions was continued until the reaction mixture had a total volume of 400 cc. The polystyrene was sulphonated and the resultant polystyrene sulphonic acid precipitated in finely divided form during the operations just described. The reaction mixture was filtered to separate the polystyrene sulphonic acid as a filter cake which remained wet with the methyl chloroform. The filter cake contained about six parts by weight of methyl chloroform per part of the sulphonated polystyrene. A portion of the polystyrene sulphonic acid was dried, weighed, and neutralized with a measured amount of an aqueous sodium hydroxide solution of known concentration. The polystyrene sulphonic acid was thereby found to contain an average of approximately 0.66 sulphonic acid radical per benzene nucleus of the same. Another portion of the polystyrene sulphonic acid was dried, weighed, and dissolved in sufficient water to form a solution containing 0.5 per cent by weight of the same. This aqueous solution was found to have a viscosity of 800 centipoises at 25° C. A 5 gram portion of the above-mentioned wet filter cake was added to 100 cc. of predried diethyl ether, containing less than 0.02 per cent by weight of moisture. The mixture was agitated to disperse the polystyrene sulphonic acid throughout the ether and then filtered. A 25 cc. portion of the filtrate, i. e. the extract, was neutralized by titration with a 0.1-normal aqueous sodium hydroxide solution. The number of cubic centimeters of the sodium hydroxide solution required for the neutralization is given in the following table. Another measured portion of the extract was analyzed for sulphur, and from the results the per cent by weight of sulphur in the entire extract was calculated. This calculated value is given in the table. The polystyrene sulphonic acid, which was collected as the residue from the extraction, was subjected to four successive similar extractions with fresh 100 cc. portions of dry diethy ether. Portions of the extract from each such extraction were tested for acidity and to determine the sulphur content thereof, as described above. The granular polystyrene sulphonic acid obtained as the residue from the last, i. e. the fifth, extraction was dried, and a weighed portion of the same was dissolved in sufficient water to form a solution containing 0.5 per cent by weight of the same. This aqueous solution of the purified polystyrene sulphonic acid had a viscosity of 30,000 centipoises at 25° C. Table I gives the data which was collected concerning the purification of the polystyrene sulphonic acid by the extraction operations.

*Table I*

| Extraction No. | Extract | | Viscosity of 0.5% aqueous polystyrene sulphonic acid solution; cps. at 25° C. |
|---|---|---|---|
| | Cc. of 0.1-N NaOH to neutralize 25 cc. of same | Percent of sulphur in same | |
| None | | | 800 |
| 1 | 2.80 | 0.0161 | |
| 2 | 0.40 | 0.0001 | |
| 3 | 0.07 | None | |
| 4 | 0.02 | None | |
| 5 | Nil | 0.0001 | 30,000 |

EXAMPLE 2

Polystyrene, having a solution viscosity of 8 centipoises at 25° C., was dissolved in carbon tetrachloride to form a solution containing 2 per cent by weight of the same. A separate solution of 4 per cent by weight of sulphur trioxide in carbon tetrachloride was prepared. The sulphur trioxide solution was added gradually to the polystyrene solution, while stirring and maintaining the resultant mixture at approximately room temperature. The addition was continued until approximately 1.4 molecular equivalents of sulphur trioxide had been fed to the mixture per mole of styrene chemically combined in the polystyrene starting material. During operation as just described, the polystyrene underwent sulphonation with formation of polystyrene sulphonic acid which precipitated as small individual particles. The resultant slurry was filtered to obtain the polystyrene sulphonic acid as a filter cake wet with adhering carbon tetrachloride. The filter cake contained between 9 and 19 parts by weight of carbon tetrachloride per part of the sulphonated polystyrene. A portion of the polystyrene sulphonic acid was dried, weighed, and titrated with a measured amount of an aqueous sodium hydroxide solution of known concentration. From the titration, it was found that the polystyrene sulphonic acid contained an average of approximately 0.81 sulphonic acid radical per aromatic nucleus. Another portion of the polystyrene sulphonic acid was dried, weighed, and dissolved in sufficient water to form a solution containing 0.5 per cent by weight of the same. This solution had a viscosity of 2,400 centipoises at 25° C. A 5 gram portion of the above-mentioned wet filter cake was subjected to seven successive extractions with dioxane. In each such extraction, there was employed a fresh 200 cc. quantity of dioxane. A 50 cc. portion of each of the extracts was neutralized by titration with a 0.1-normal aqueous sodium hydroxide solution. Another measured portion of each extract was analyzed for sulphur, and from the analysis the sulphur content of the entire extract was calculated. The purified, granular polystyrene sulphonic acid obtained as a residue from the seventh of the extractions was dried, and a weighed portion thereof was dissolved in water to form a solution containing 0.5 per cent by weight of the same. This solution had a viscosity of 28,000 centipoises at 25° C. Table II gives data which was collected relative to the above-mentioned extraction of impurities from the granular polystyrene sulphonic acid. It may be mentioned that the dioxane employed as the extractant contained 0.0002 per cent by weight of sulphur and that a 50 cc. portion of the dioxane required 0.9 cc. of a 0.1-normal aqueous sodium hydroxide solution to neutralize the same. The corresponding values for the extracts, which are given in Table II, are corrected by subtraction, from the found values, of the above values for the dioxane itself.

*Table II*

| Extraction No. | Extract | | | Viscosity of 0.5% aqueous solution of the polystyrene sulphonic acid, cps. at 25° C. |
|---|---|---|---|---|
| | Volume, cc. | Cc. of 0.1-N NaOH solution to neutralize 50 cc. of same | S-content, percent | |
| None | | | | 2,400 |
| 1 | 196 | 4.46 | 0.0092 | |
| 2 | 192 | 0.96 | 0.0004 | |
| 3 | 194 | 0.48 | Nil | |
| 4 | 196 | 0.29 | 0.0004 | |
| 5 | 193 | 0.27 | 0.0010 | |
| 6 | 193 | 0.09 | Nil | |
| 7 | 193 | 0.09 | Nil | 28,000 |

EXAMPLE 3

Polystyrene, having a solution viscosity of 3 centipoises at 25° C., was sulphonated by reaction with sulphur trioxide in the presence of carbon tetrachloride as a reaction medium. The procedure in carrying out the sulphonation was similar to that described in Example 2. The slurry of polystyrene sulphonic acid, thus formed, was filtered to obtain the product as a filter cake wet with adhering carbon tetrachloride, i. e. containing between 9 and 19 parts by weight of carbon tetrachloride per part of sulphonated polystyrene. In each of three tests, a 10 gram portion of the filter cake was added to a 200 cc. portion of a pre-dried liquid extractant and the mixture was agitated to disperse the polystyrene sulphonic acid granules throughout the body of liquid. Water was then added very gradually, and in measured amount, while vigorously stirring the mixture to cause solution of the water in the extractant. The addition of water was continued to a point at which the polystyrene sulphonic acid granules became tacky and tended to coalesce with one another. The moisture present at this point is approximately the maximum amount than can be tolerated in an extraction carried out in accordance with the invention. Table III names the liquid extractant which was employed in each test and gives the proportion of water (expressed as per cent of the weight of the extractant) which was present in the mixture when the polystyrene sulphonic acid granules became tacky.

*Table III*

| Test No. | Extractant | Percent of H₂O to cause tackiness |
|---|---|---|
| 1 | Diethyl ether | 0.86 |
| 2 | Dioxane | 0.409 |
| 3 | Acetone | 0.825 |

EXAMPLE 4

In each of a number of tests, a small amount, i. e. about 1.5 grams of a carbon tetrachloride-wet filter cake of granular polystyrene sulphonic acid, similar to that employed in Example 3, was added to about 15 cc. of a liquid and the mixture was agitated. A different kind of liquid was used in each test. In some instances, the polystyrene sulphonic acid granules became scattered throughout the liquid without becoming tacky or swollen to any great extent. The liquids giving such a result may be suitable for use in extracting impurities from the granular polystyrene sulphonic acid. In other instances, the polystyrene sulphonic acid was dissolved, or rendered tacky and swollen, by the liquids. The liquids giving these results are not suitable for use as extractants in the process of the invention. Table IV lists the liquids which were found to be satisfactory as extractants, and also those which were found to be unsatisfactory, according to such tests.

*Table IV*

Satisfactory liquids:
 Diethyl ether
 n-Butyl ether
 Bis-(beta-chloro-ethyl) ether
 Dioxane
 Tetrahydrofuran
 Acetone
 Ethyl methyl ketone
 Diethyl ketone
 Liquid sulphur dioxide
 Methylene chloride Unsatisfactory liquids:
 Acetic acid
 n-Butyl alcohol
 Ethyl acetate
 Acetaldehyde
 Acetal
 Furfural
 Acrylonitrile
 Chloroform

EXAMPLE 5

A number of the liquids, which the tests of Example 4 indicated would be satisfactory for use in extracting impurities from granular polystyrene sulphonic acid, were further tested to determine their actual effectiveness for the purpose. The polystyrene sulphonic acid which was used in this further testing was in the form of a carbon tetrachloride-wet filter cake similar to that employed in Examples 3 and 4. It contained acidic inorganic impurities, incident to its production, which impurities should be dissolved and removed by treatment with a satisfactory liquid extractant. The procedure in each test was to add a 3 gram portion of the filter cake, containing the impure granular polystyrene sulphonic acid, to 50 cc. of a liquid, agitate the mixture to disperse the polystyrene sulphonic acid granules, or particles, throughout the liquid, and filter to separate the polystyrene sulphonic acid granules from the liquid. A 25 cc. portion of the filtrate was then neutralized by titration with a 0.1-normal aqueous sodium hydroxide solution. The volume of the sodium hydroxide solution required for the neutralization served as a measure of the effectiveness of a liquid as an agent for extracting the acidic inorganic impurities from the polystyrene sulphonic acid. Table V names each liquid which was tested as an extractant and states the volume, in cubic centimeters, of the 0.1-normal aqueous sodium hydroxide solution which was required to neutralize a 25 cc. portion of the resulting extract.

*Table V*

| Test No. | Liquid tested | Cc. of 0.1-N NaOH solution required to neutralize 25 cc. of extract |
|---|---|---|
| 1 | Dioxane | 9.45 |
| 2 | Acetone | 7.64 |
| 3 | Methyl ethyl ketone | 7.10 |
| 4 | Diethyl ether | 5.05 |
| 5 | Di-(n-butyl) ether | 4.13 |
| 6 | Tetrahydrofuran | 2.79 |
| 7 | Methylene chloride | 0.09 |

The results show that all of the above liquids are effective as agents for extracting impurities from an alkenyl aromatic resin sulphonic acid, but that the proportion of liquid required to purify such product is greater when using methylene chloride as an extractant than when employing the other liquids, e. g. dioxane. However, an extractant may readily be distilled from the extract and be recycled to the resin sulphonic acid which is being purified by extraction; hence, the values given in Table V merely indicate the relative extent of recycling required when using the respective extractants. Other considerations, such as the volatility of the liquid extractant, and particularly the ease with which traces of the same may be vaporized and removed from the treated resin sulphonic acid to obtain the latter in a substantially odorless, purified condition, are of importance in choosing the liquid best suited for use as the extractant. Diethyl ether is highly effective in extracting impurities from the resin sulphonic acids, and remaining traces of the same are readily vaporized from the product. Accordingly, it is preferably used as the extractant.

Any of the aforementioned alkenyl aromatic resins may be sulphonated with chlorosulphonic acid or sulphur trioxide, as herein described, to obtain corresponding resin sulphonic acids in a granular form containing acidic inorganic impurities. The impurities may be removed from any such product, without destroying the desirable granular form of the product, by the extraction procedure of the invention. Accordingly, the invention is applicable in making and purifying any of a wide variety of granular alkenyl aromatic resin sulphonic acids, e. g. sulphonic acids derived from polystyrene, from polymers of ar-vinyltoluene, from copolymers of styrene and ar-vinyltoluene, and from copolymers of styrene and alpha-methylstyrene, etc.

Other modes of applying the principle of the invention may be employed instead of those explained, change being made as regards the method herein disclosed, provided the step or steps stated by any of the following claims, or the equivalent of such stated step or steps, be employed.

We claim:

1. In a method wherein an alkenyl aromatic resin is sulphonated to a obtain a corresponding granular resin sulphonic acid which contains acidic inorganic impurities incident to formation of the same, the step of extracting the impurities from the granular resin sulphonic acid, without destroying the granular form of the latter, by washing the resin sulphonic acid with at least one substantially anhydrous liquid of the group consisting of ethers, ketones, liquid sulphur dioxide and methylene chloride.

2. A method, as described in claim 1, wherein the liquid which is used to extract the impurities is diethyl ether.

3. In a method wherein, a thermoplastic alkenyl aromatic resin is dissolved in a liquid chlorinated hydrocarbon and the solution is treated with a sulphonating agent of the group consisting of chlorosulphonic acid and sulphur trioxide to form a corresponding resin sulphonic acid which precipitates in a granular form containing acidic inorganic impurities, the steps of separating the granular resin sulphonic acid from the liquid in which it is formed and extracting the acidic inorganic impurities from the granular resin sulphonic acid by washing the latter with at least one substantially anhydrous liquid of the group consisting of ethers, ketones, liquid sulphur dioxide and methylene chloride.

4. A method, which comprises extracting, from a granular alkenyl aromatic resin sulphonic acid, acidic inorganic impurities incident to formation of the same, by washing the granular resin sulphonic acid with at least one substantially anhydrous liquid of the group consisting of ethers, ketones, liquid sulphur dioxide and methylene chloride.

5. A method, as described in claim 4, wherein the substantially anhydrous liquid which is used to extract the impurities is diethyl ether.

HAROLD H. ROTH.
HUGH B. SMITH.

References Cited in the file of this patent

UNITED STATES PATENTS

| Number | Name | Date |
| --- | --- | --- |
| 2,533,211 | Baer | Dec. 12, 1950 |